(12) United States Patent
Fujishima (10) Patent No.: US 7,703,842 B2
(45) Date of Patent: Apr. 27, 2010

(54) SLIDING ROOF STRUCTURE AND VEHICLE HAVING THE SAME

(75) Inventor: Ryouta Fujishima, Yokosuka (JP)

(73) Assignee: Kanto Auto Works, Ltd. (JP)

( * ) Notice: Subject to any disclaimer, the term of this patent is extended or adjusted under 35 U.S.C. 154(b) by 0 days.

(21) Appl. No.: 12/209,085

(22) Filed: Sep. 11, 2008

(65) Prior Publication Data

US 2009/0102243 A1    Apr. 23, 2009

(30) Foreign Application Priority Data

Oct. 23, 2007  (JP)  ............................. 2007-275816
Oct. 23, 2007  (JP)  ............................. 2007-275817

(51) Int. Cl.
  *B60J 7/11*    (2006.01)
(52) U.S. Cl. .................. 296/218; 296/219; 296/107.13; 296/107.19
(58) Field of Classification Search ............ 296/107.06, 296/107.09, 107.11, 107.13, 107.15, 107.19, 296/218, 219
See application file for complete search history.

(56) References Cited

U.S. PATENT DOCUMENTS

| 5,141,283 | A * | 8/1992 | Omoto et al. ................ 296/219 |
| 6,409,259 | B1 * | 6/2002 | Patelczyk et al. ........... 296/219 |
| 6,910,727 | B2 * | 6/2005 | Dietl ...................... 296/107.09 |
| 7,163,260 | B2 * | 1/2007 | Reitzloff et al. ............. 296/219 |
| 7,240,960 | B2 * | 7/2007 | Fallis et al. .................. 296/218 |

(Continued)

FOREIGN PATENT DOCUMENTS

JP              62088613  A  *  4/1987  ................. 296/219

(Continued)

OTHER PUBLICATIONS

Applicants hereby bring attention of the examiner to: Pending U.S. Appl. No. 12/209,114, Miyajima, et al., "Storage Structure for Storing a Cover Member of a Sliding Roof Type Vehicle and Vehicle Having the Same", filed Sep. 11, 2008. As-filed copy included.

(Continued)

*Primary Examiner*—Jason S Morrow
(74) *Attorney, Agent, or Firm*—Chen Yoshimura LLP (57) ABSTRACT

A sliding roof structure of a vehicle includes rails $5a$, $5b$ installed on the right and left roof side portions of the vehicle and a cover member 2 that can be slid and folded along the rails $5a$, $5b$, wherein the cover member 2 is comprised of a detachable inner cover member 30 and an outer cover member 40, which is slid along the rails $5a$, $5b$ and to which the inner cover member 30 is mounted in detachable state, or the cover member 2 is comprised of a base cover member 7, which is made by attaching a bottom cover sheet 9 to the bottom frame member 10, and a top cover member 8, which is made by attaching a top cover sheet $8a$ to the top frame member 14, either the top frame member 14 or the bottom frame member 10 is equipped with an engaging portion $14a$ and the other with a groove 12 for supporting the engaging portion $14a$, and the engaging portion $14a$ is inserted into the groove 12 and the top cover member 8 attached to the base cover member 7 in detachable state.

9 Claims, 12 Drawing Sheets

U.S. PATENT DOCUMENTS

| | | | |
|---|---|---|---|
| 7,416,247 B2* | 8/2008 | Dunneback et al. | 296/219 |
| 7,523,977 B2* | 4/2009 | Fallis et al. | 296/118 |
| 7,527,328 B2* | 5/2009 | Reitzloff et al. | 296/219 |
| 2002/0005657 A1* | 1/2002 | Farber | 296/219 |
| 2004/0017097 A1* | 1/2004 | Albert et al. | 296/219 |
| 2005/0073179 A1* | 4/2005 | Williams | 296/218 |
| 2005/0280293 A1* | 12/2005 | MacNee et al. | 296/219 |
| 2007/0024080 A1* | 2/2007 | Grimm et al. | 296/107.13 |

FOREIGN PATENT DOCUMENTS

| | | |
|---|---|---|
| JP | H03-159818 A | 7/1991 |
| JP | H03-204339 A | 9/1991 |
| JP | 1994-183263 A | 7/1994 |
| JP | 2002-046473 A | 2/2002 |
| JP | 2003-507244 A | 2/2003 |
| JP | 2005-313737 A | 11/2005 |
| WO | 01-14157 A1 | 3/2001 |

OTHER PUBLICATIONS

Applicants hereby bring attention of the examiner to: Pending U.S. Appl. No. 12/209,121, Jun Kanamori, "Storage Structure for a Cover Member of a Sliding Roof Type Vehicle and a Vehicle Provided with the Same", filed Sep. 11, 2008. As-filed copy included.

Applicants hereby bring attention of the examiner to: Pending U.S. Appl. No. 12/209,130, Fujishima, et al., "Sliding Roof Structure and Vehicle Equipped with the Same", filed Sep. 11, 2008. As-filed copy included.

European Search Report in counterpart application EP 08 16 4122, dated Feb. 24, 2009, citing Foreign Reference Nos. 4 and 5.

Communication from European Patent Office in counterpart application EP 08 16 4122, dated Sep. 21, 2009.

* cited by examiner

SLIDING ROOF STRUCTURE AND VEHICLE HAVING THE SAME

TECHNICAL FIELD

The present invention relates to a sliding roof structure of a vehicle, whose open section in the roof can be opened/closed by folding/stretching a cover, a sliding roof structure whose cover can be replaced easily, in particular.

BACKGROUND ART

A sliding roof structure of a vehicle is well known as a means for taking more light into vehicle interior and facilitating intake of outside air (JP1994-183263A, for example).

An open section of a sliding roof structure, which is configured, enclosed with the right and left roof side portions, the roof front portion, and the roof rear portion, is provided with a cover made of cover sheet reinforced by a skeletal structure, with both ends of the skeletal member inserted into the rails on the right and left roof side portions in slidable state. By sliding the both ends of skeletal member along the rails on the right and left side portions, the cover sheet can be extended to close the open section, or folded to form an open section. The cover sheet can be extended or folded either manually or electrically. A vehicle in sliding roof structure allows the driver and passengers to feel refreshed, and its design attracts attention, thus ensuring increased added value, compared with vehicles without an open section.

DISCLOSURE OF INVENTION

Problems to be Resolved by the Invention

With a vehicle of sliding roof structure, however, once the cover has been assembled, the cover sheet cannot be replaced unless the vehicle is disassembled. Consequently, users may not always be able to select and purchase a sliding roof type vehicle equipped with a cover sheet in colors or patterns that appeal to their taste. Reversely, users may have no other choice but to select and purchase a sliding roof type vehicle equipped with a cover sheet in colors or patterns they do not like.

To solve this problem, purchasers may be allowed to select colors and patterns of a cover sheet they like in advance, and a sliding roof type vehicle to their taste is delivered accordingly. However, this not only requires longer delivery term but also increases production cost, which is why this production system has not been realized.

If such a production system should be adopted, users cannot replace the cover sheet of the sliding roof type vehicle they purchased by themselves. Users cannot use different cover sheets as the situation demands, on weekdays and weekends, for example.

Another problem is that damaged or deteriorated cover sheet cannot be replaced easily.

It is an object of the present invention to provide a sliding roof structure, wherein a cover sheet can be replaced depending on days of driving or destinations.

Means of Solving the Problems

First this invention discloses a sliding roof structure of a vehicle comprising:

rails installed along the right and left side portions of the roof of the vehicle; and a cover member which is slid and folded along the rails, wherein the cover member includes a detachable first cover member and a second cover member which is slid along the rails and to which the first cover member is attached in detachable state.

Also this invention discloses another sliding roof structure of a vehicle comprising:

rails installed along the right and left sides of the roof of the vehicle, and a cover member which is slid and folded along the rails, wherein the cover is made up of a detachable inner cover member and an outer cover member, which slides along the rails and to which the inner cover member is attached in detachable state, the inner cover member includes a quasi-rectangular inner frame member, multiple structural members which bridge the inner frame member in the width direction of the vehicle, and a pair of cover sheets at the top and bottom stretched over the inner frame member, the outer cover member includes a quasi-rectangular outer frame member enclosing the inner frame member, multiple sliding members installed in the width direction of the vehicle, and a pair of cover sheets at the top and bottom stretched over the outer frame member, either one of the inner frame member or the outer frame member includes an engaging portion on the side facing the other, the engaging portion being inserted into the groove, and the inner cover member thus being attached to the outer cover member in detachable state.

In the above-mentioned the sliding roof structure, a pair of rod-shaped members is connected via a joint portion, and the outer edges of the rod-shaped members do not rotate upward.

In the above-mentioned the sliding roof structure, the right and left side portions of the inner frame member and the outer frame member, which are placed along the sides of the roof, are undulated along the longitudinal direction of the vehicle, with thin portion and thick portion placed alternately, to facilitate folding the cover member.

In the above-mentioned the sliding roof structure, the inner cover member is attached to the outer cover member by sliding a fixture provided with an opening section along the inner frame member and the outer frame member while integrating the inner frame member and the outer frame member.

Also this invention discloses another sliding roof structure of a vehicle comprising:

rails installed on the right and left side portions of the roof of the vehicle; and a cover member which is slid and folded along the rails;

wherein the cover member is made up of a base cover member which has a bottom frame member and a bottom cover sheet stretched over the bottom frame member, and a top cover member which has a top frame member and a top cover sheet stretched over the top frame member, either one of the top frame member or the bottom frame member being provided with an engaging portion, whereas the other being provided with a support portion for engaging, and the engaging portion being inserted into the support portion for engaging so as to attach the cover base member to the top cover member in detachable state.

In the above-mentioned the sliding roof structure, the support portion is a groove which is cut along the bottom frame member; the engaging portion is formed on the top frame member so that the engaging portion has convex cross-sectional area; and the engaging portion is inserted into the groove.

In the above-mentioned the sliding roof structure, wherein the right and left side portions of the bottom frame member, which extend in the longitudinal direction of the vehicle, are undulated, with a thin portion and a thick portion placed one after another in the longitudinal direction of the vehicle, to facilitate folding the cover member.

BRIEF DESCRIPTION OF THE DRAWINGS

FIG. 11 (A) is a perspective view of the fixture in FIG. 10 viewed from behind, and FIG. 11 (B) depicts the fixture placed upside down and viewed from behind.

BEST EMBODIMENT FOR IMPLEMENTING THE INVENTION

Preferred embodiments of the invention are described below by referring to attached drawings.

First Embodiment

Figure 1:
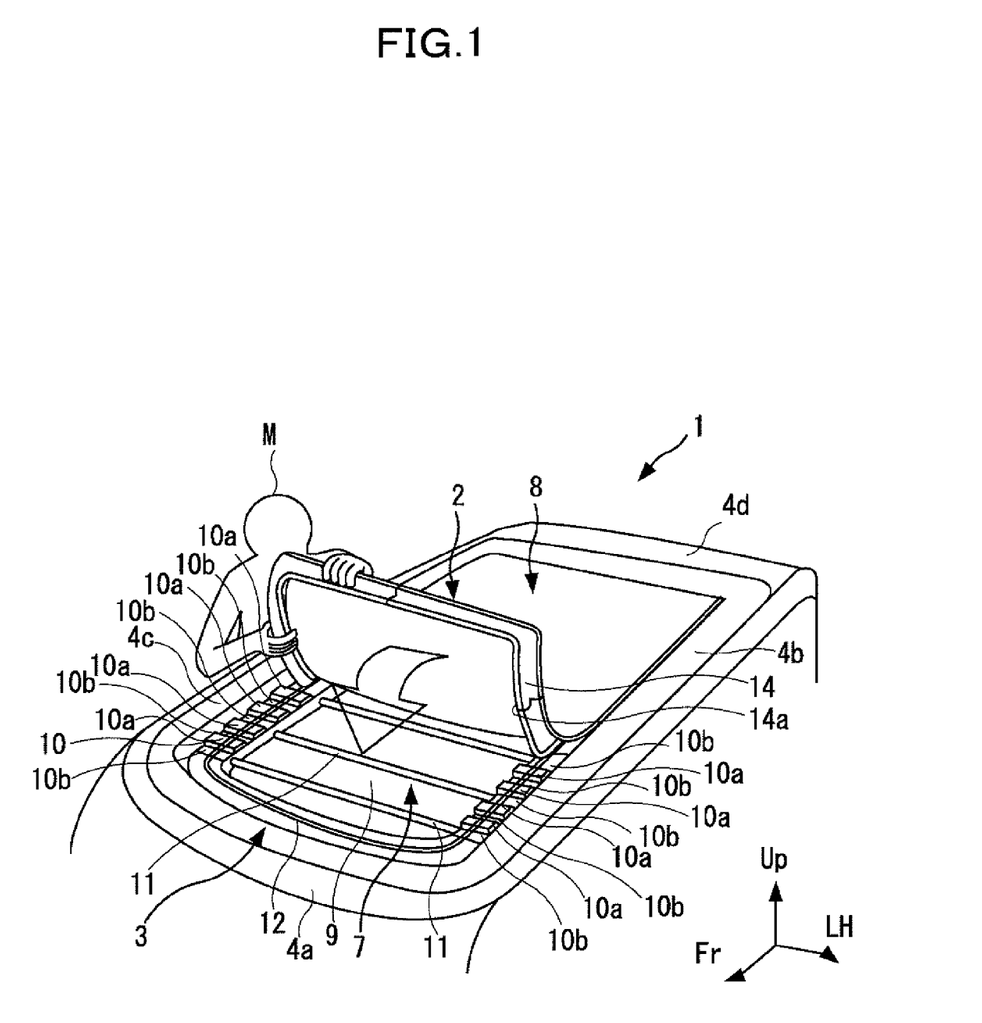
FIG. 1 is a perspective view of a sliding roof structure related to the first embodiment of the present invention.
Figure 2:
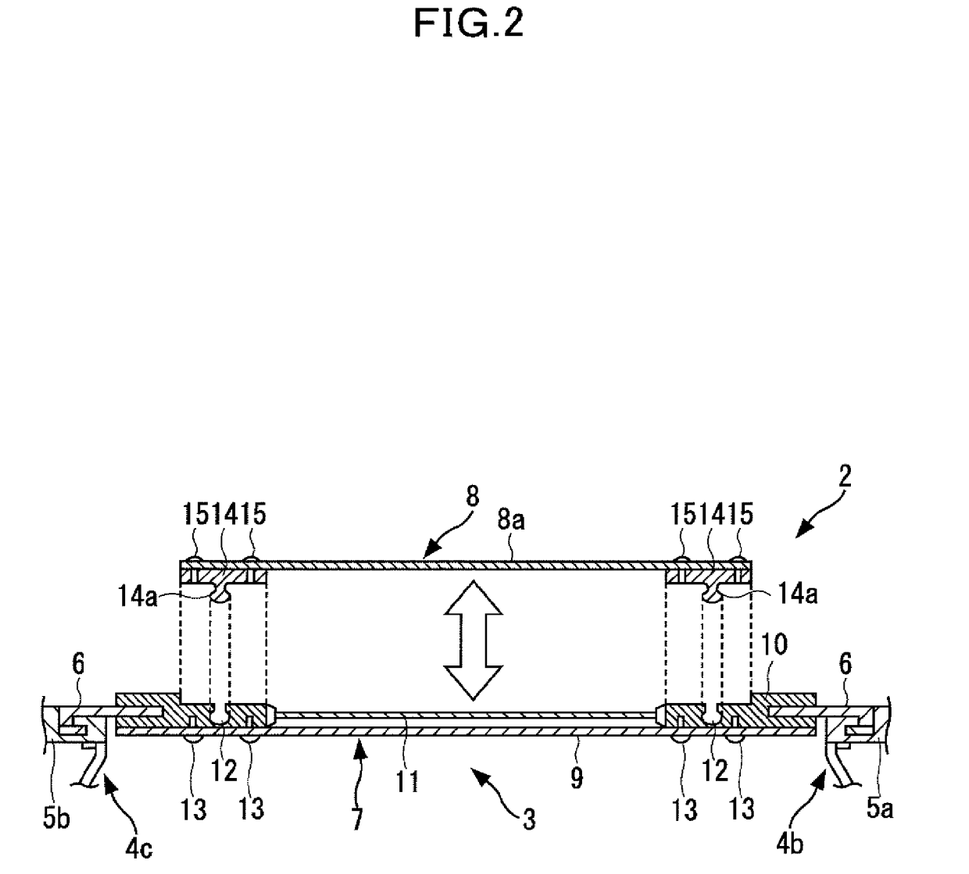
FIG. 2 is a cross-sectional view in the width direction of the cover detached from the sliding roof structure in FIG. 1.

FIG. 1 is a perspective view depicting a sliding roof structure related to the first embodiment of this invention. FIG. 2 is a cross-sectional view in the width direction of the top part of the sliding roof structure shown in FIG. 1. The arrow marked as "Up" in the drawing indicates the top of the vehicle, while "Fr" indicates the front and "LH" the left-hand side of the vehicle.

As shown in FIG. 1, the sliding roof structure related to the first embodiment of this invention applies to a sliding roof type vehicle 1, namely, a sliding roof type vehicle 1 in which the open section 3 in the roof is opened/closed with a cover member 2. The open section in the roof 3 is formed, enclosed in a rectangular form created by the roof front portion 4a, the right and left roof side portions 4b, 4c, and the roof rear portion 4d. The left and right side portions 4b, 4c are provided with rails 5a, 5b along the longitudinal direction of the vehicle, and the sliding members 6, 6 of the cover member 2 slides along the rails 5a, 5b, folding or spreading the cover member 2 and thus opening or closing the roof.

A pair of rails 5a, 5b is laid along the right and left roof side portions 4b, 4c, facing opposite to each other, in the longitudinal direction of the vehicle. In the illustrated example, the edge portion outgoing in the width direction of the vehicle is in the shape of a hook folded upward, and the edge portions are laid along the longitudinal direction of the vehicle. A pair of sliding members 6 is mounted to the cover member 2 in the width direction of the vehicle. The end portion of the sliding member 6 is equipped with a hook folded downward to match the structure of the rails 5a, 5b. These hooks are engaged in and slides along the rails 5a, 5b.

In the embodiment of this invention, the cover member 2 comprises a base cover member 7 and a top cover member 8 which can be detached from the base cover member 7. As shown in FIG. 2, the base cover member 7 includes a bottom cover sheet 9 and a bottom frame member 10, wherein the bottom cover sheet 9 is spread over the bottom frame member 10. The top cover member 8 includes a top cover sheet 8a and a top frame member 14, wherein the top cover sheet 8a is spread over the top frame member 14. An engaging portion 14a is provided on either the top frame member 14 or the bottom frame member 10, and a groove 12 is provided on the other as a receiving member of the engagement.

This section details the top cover member 8.

As shown in FIG. 2, the top cover member 8 comprises the top cover sheet 8a and the top frame member 14 which is in a rectangular form, wherein the top cover member 8 is stretched over the top frame member 14. The top cover sheet 8a is made of tough, flexible, and waterproof material. An engaging portion 14a is provided protruding downward at the bottom of the top frame member 14. This engaging portion 14a is formed along the top frame member 14 so that it matches the groove 12. The periphery of the top cover sheet 8a is placed over and fixed to the top frame member 14, fastened with multiple screws 15.

This section details the base cover member 7.

The base cover member 7 is comprised of a bottom cover sheet 9, bottom frame member 10, structural member 11, and sliding member 6. The bottom cover sheet 9, which is made of sturdy, flexible, and waterproof material, is large enough to cover the open section 3. The bottom frame member 10 is in a rectangular form, framed by the left, right, front, and rear side portions. Multiple sliding members 6 described above are mounted at certain intervals on the right and left side portions of the bottom frame member 10 in the longitudinal direction of the vehicle. The top face of the bottom cover sheet 9 is attached to the bottom face of the bottom frame member 10 by fastening the peripheral part of the bottom cover sheet 9 using multiple screws 13. As shown in FIG. 2, the top of the bottom frame member 10 is caved in for the top frame member 14 to slip in. The base of the sliding member 6 is embedded in the side portions of the bottom frame member 10 in the width direction of the vehicle.

Figure 3:
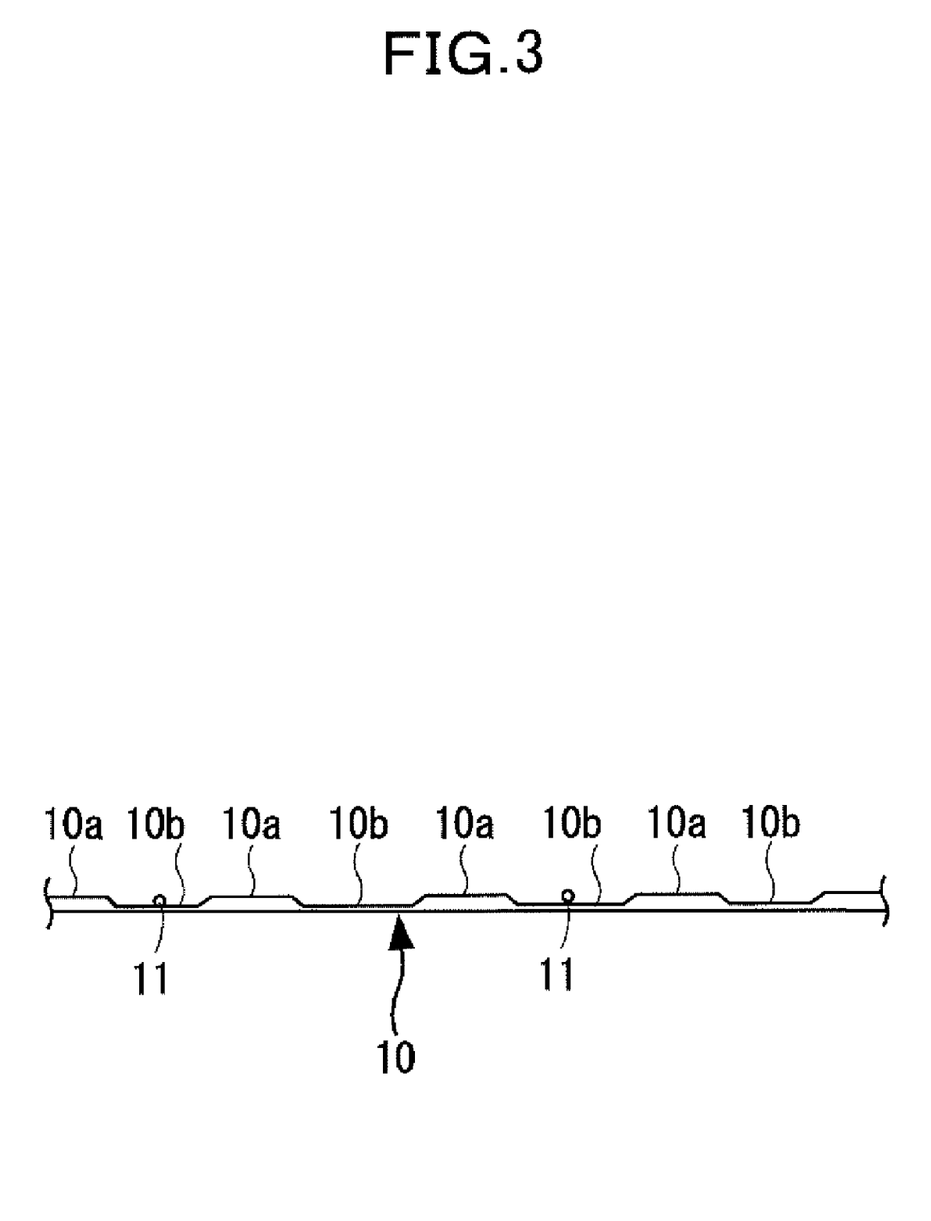
FIG. 3 is a schematic diagram of a lower frame member viewed from the width direction.

FIG. 3 shows the lower frame member viewed from the width direction. As shown in FIGS. 1 and 3, the right and left side portions of the bottom frame member 10 are continuously undulated, with a thick portion 10a and a thin portion 10b alternately placed next to each other. In the right and left frame portions, in which the thick portion 10a and the thin portion 10b are laid out alternately, structural members 11 are installed at every other thin portion 10b. The structural member 11 supports the bottom cover sheet 9 in the width direction of the vehicle to maintain the tension of the sheet. The structural member 11 is fastened between the bottom frame members 10 on the right and left side portions of the frame. The structural member 11 may be a rod stock made of steel, for example.

With the sliding roof structure related to the embodiment of this invention, the cover member 2 is configured with the engaging portion 14a of the top frame member 14 inserted into the groove 12 of the bottom frame member 10. As a result, the bottom cover sheet 9, which is stretched over the bottom frame member 10, and the top cover sheet 8a, which is stretched over the top frame member 14, are supported by both frames at the top and the bottom 10, 14. By removing the engaging portion 14a of the top frame member 14 from the groove 12 of the bottom frame member 10, the top cover member 8 can be removed from the base cover member 7.

With the cover member 2 configured as described above, by sliding the sliding members 6, 6 on both sides along the rails 5a, 5b, the top cover sheet 8a and the bottom cover sheet 9 can be folded. On the contrary, by sliding the sliding members 6, 6 toward the front side of the vehicle, the top cover sheet 8a and the bottom cover sheet 9 can be stretched over the open section. The open section of the roof can thus be opened or closed.

Figure 4:
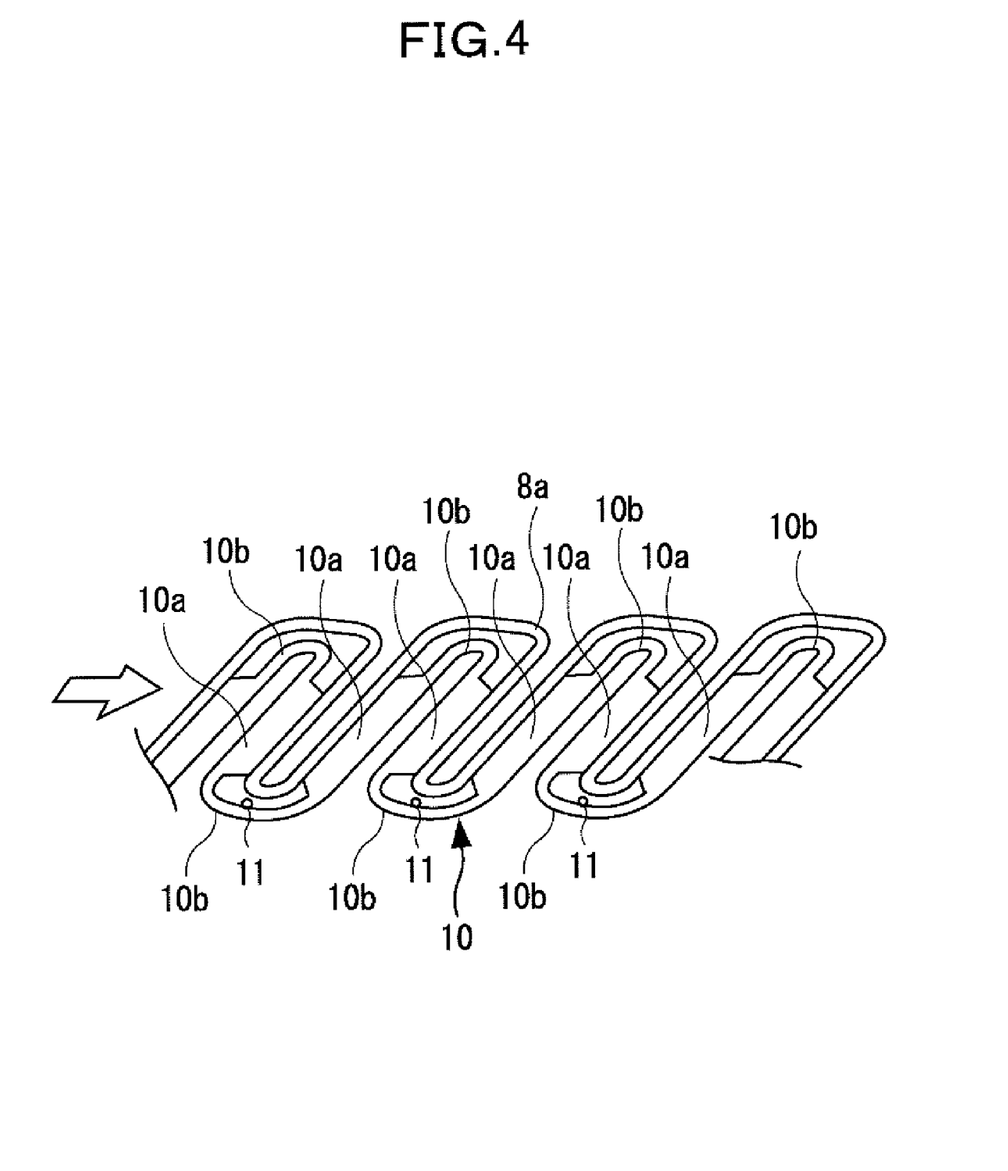
FIG. 4 is a schematic diagram of the base and the top of a sliding roof structure viewed from the width direction, with the cover sheet folded.

The right and left side portions of the bottom frame member 10 are continuously undulated, with the thick portion 10a and the thin portion 10b alternately placed next to each other. The sliding members 6 are placed on the roof side of every other thin portion 10a, and the skeletal member 11 is bridged between the left side portion and the right side portion of every other thin portion 10a, which facilitates folding of the cover member 2 as shown in FIG. 4. Specifically, when the sliding member 6 is made to slide toward the rear side of the vehicle, the thin portion 10b into which the structural member 11 of the bottom frame member 10 is embedded is valley-folded, while the thin portion 10b into which no structural member 11 is embedded is mountain-folded, thus accordion-folding the cover member 2 easily.

Users of the sliding roof type vehicle 1 can remove the top cover member 8 out of the base cover member 7 by removing the engaging portion 14a of the top frame member 14 from the groove 12 of the bottom frame member 10. Users can provide multiple cover sheets 8a of their choice of colors and patterns for replacement in advance, and replace the top cover member 8 freely depending on the mood of the day or destinations.

The damaged top cover sheet 8a can also be replaced quite easily. In order for users to replace the sheet by themselves, it is desirable that the cross-sectional area of the protrusions of a part of the engaging portion 14a on the rear side of the vehicle be made smaller to make the engagement looser. In this case, the user M should insert the protrusions starting from the rear toward the front side of the vehicle.

As described above, with the sliding roof structure of the present invention, the top cover member 8 is mounted to the base cover member 7 in detachable state. Since the top cover member 8 can be replaced as required, the invention can be implemented in various embodiments without departing from the scope of the invention. A support portion for engaging portion such as grooves may be provided on the top frame member 14, while engaging portion may be provided on the bottom frame member 10.

Second Embodiment

Figure 5:
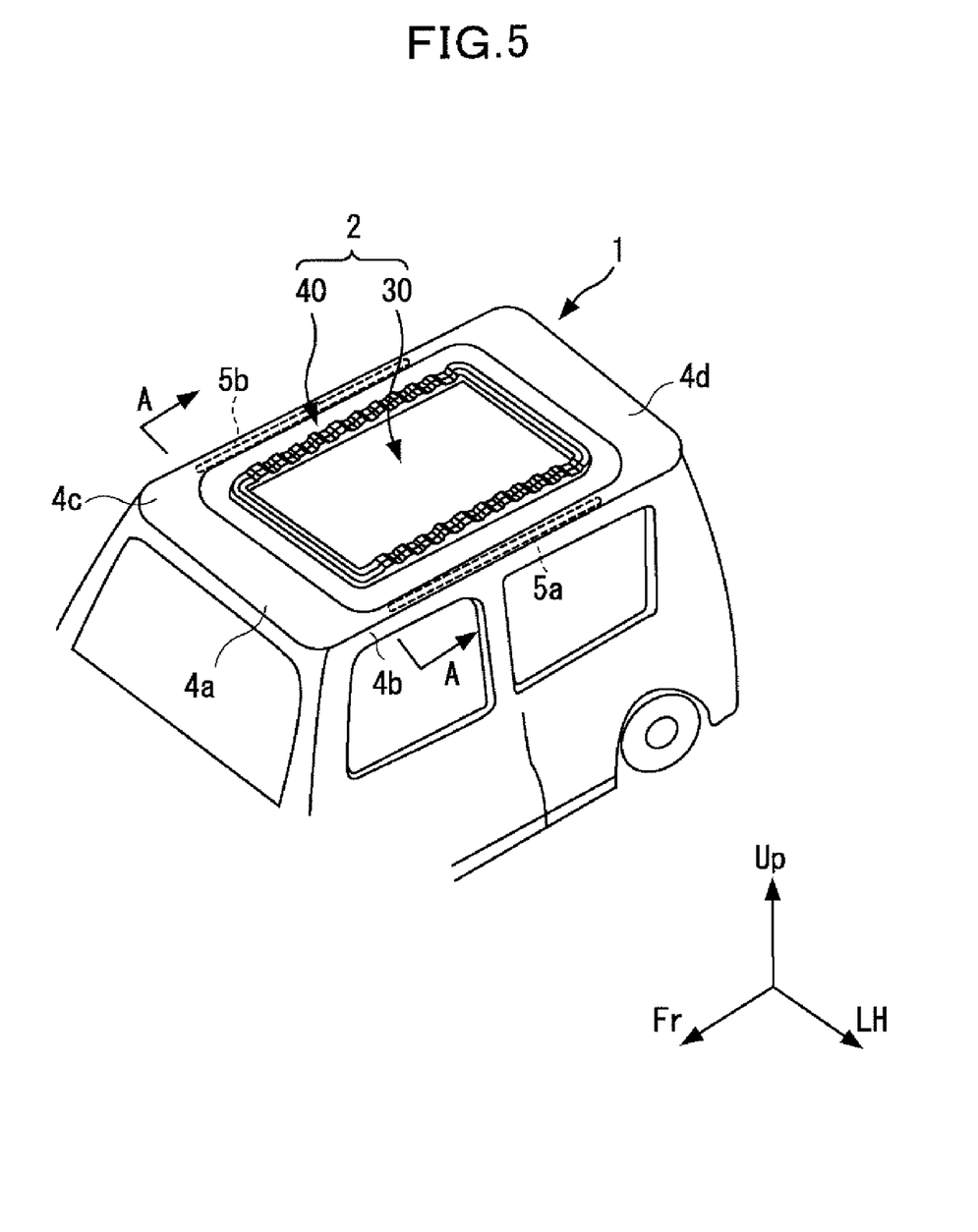
FIG. 5 is a perspective view of a vehicle in sliding roof structure related to the second embodiment of the present invention.
Figure 6:
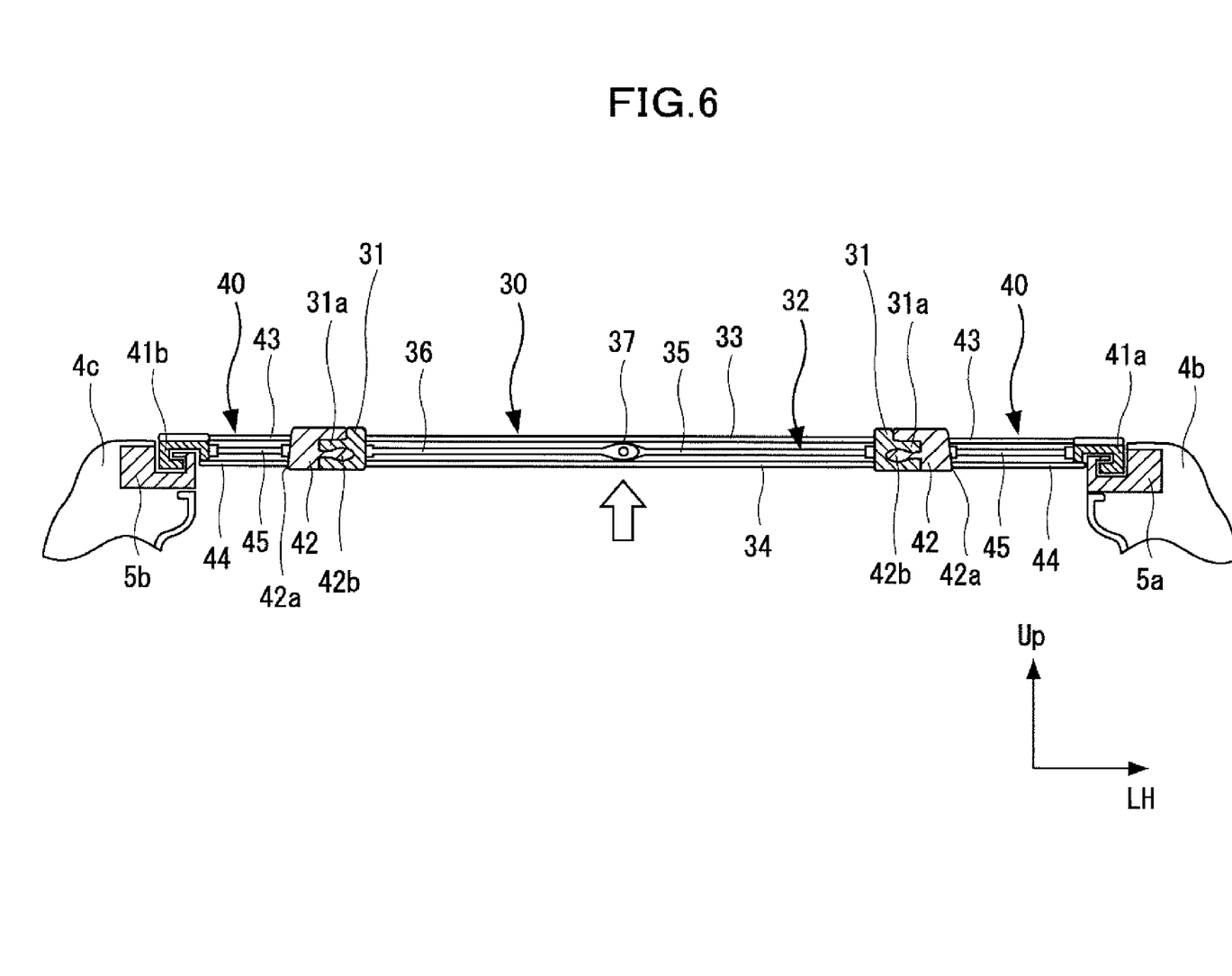
FIG. 6 is a cross-sectional view viewed from A-A in FIG. 5.

FIG. 5 is a perspective view of a vehicle in sliding roof structure related to the second embodiment of this invention. FIG. 6 is a cross-sectional view viewed from A-A in FIG. 5. The arrow marked as "Up" in the drawing indicates the top of the vehicle, while "Fr" indicates the front and "LH" the left-hand side of the vehicle.

The sliding roof structure related to the second embodiment of this invention applies to a sliding roof type vehicle 1, whose open section in the roof is opened or closed with a cover member 2 as shown in FIGS. 5 and 6. The open section in the roof 3 is formed, enclosed in a rectangular form created by the roof front portion 4a, the right and left roof side portions 4b, 4c and the roof rear 4d portion. The left and right side portions 4b, 4c are equipped with rails 5a, 5b along the longitudinal direction of the vehicle, and the sliding members 41a, 41b of the cover member 2 slides along the rails 5a, 5b, folding or spreading the cover member 2 and thus opening or closing the roof.

A pair of rails 5a, 5b is laid along the roof side portions 4b, 4c, facing opposite to each other, in the longitudinal direction of the vehicle. In the example shown in FIG. 6, the rails 5a, 5b have cross-sectional area in the shape of a hook folded upward, and are laid along the longitudinal direction of the vehicle. Sliding members 41a, 41b are mounted to the cover member 2 in the width direction of the vehicle. The end portion of the sliding member 6 is equipped with a hook folded downward to match the structure of the rails 5a, 5b. These hooks are engaged in and slide along the rails 5a, 5b.

In the second embodiment, the cover member 2 includes the inner cover member 30 and the outer cover member 40, wherein the inner cover member 30 is attached to the outer cover member 40 in detachable state, as shown by FIGS. 5 and 6.

The inner cover member 30 is comprised of rectangular inner frame member 31, multiple structural members 32, which bridge the inner frame member 31 in the width direction of the vehicle, and a pair of cover sheets 33, 34 at the top and the bottom stretched over the inner frame member 31.

The outer cover member 40 is comprised of a rectangular outer frame member 42 enclosing the inner frame member 31, and multiple sliding members 41a, 41b placed in the width direction of the vehicle from the side portion 42a of the outer frame member 42. A pair of cover sheets 43, 44 is stretched between these multiple sliding members 41a, 41b and the outer frame member 42 to construct the outer cover member 40. Multiple skeletal members 45 bridge between the side portion 42a of the outer frame member 42 and the sliding members 41a, 41b.

In the second embodiment, the outer cover member 40 is formed as a frame, and the inner cover member 30 is inserted into that frame. To do so, either one of the internal frame member 31 or the outer frame member 42 is provided with a groove on the side connected to the other, whereas the other is provided with an engaging portion having a convex cross-sectional area on the side connected to the other. Since the outer frame member 42 is placed on the outer periphery of the inner frame member 31, the side portions and the front and rear portions of the inner frame member 31 are placed adjacent to those of the outer frame member 42. The outer periphery of the inner frame member 31 faces the inner periphery of the outer frame member 42. In FIG. 6, a concave caving toward the center of the vehicle is extended around the outer periphery of the inner frame member 31 to form a groove 31a, while a convex protruding toward the center of the vehicle is extended around the inner periphery of the outer frame member 42 to form an engaging portion 42b. Unlike the case shown in FIG. 6, an engaging portion may be formed by extending a convex protruding toward the outside of the vehicle around the outer periphery of the inner frame member 31, and a groove may be formed by extending a concave caving toward the outside of the vehicle around the inner periphery of the outer frame member 42.

In the second embodiment, by inserting the engaging portion 42b into the groove 31a, the inner cover member 30 can be attached to the outer cover member 40 in detachable state.

Figure 7:
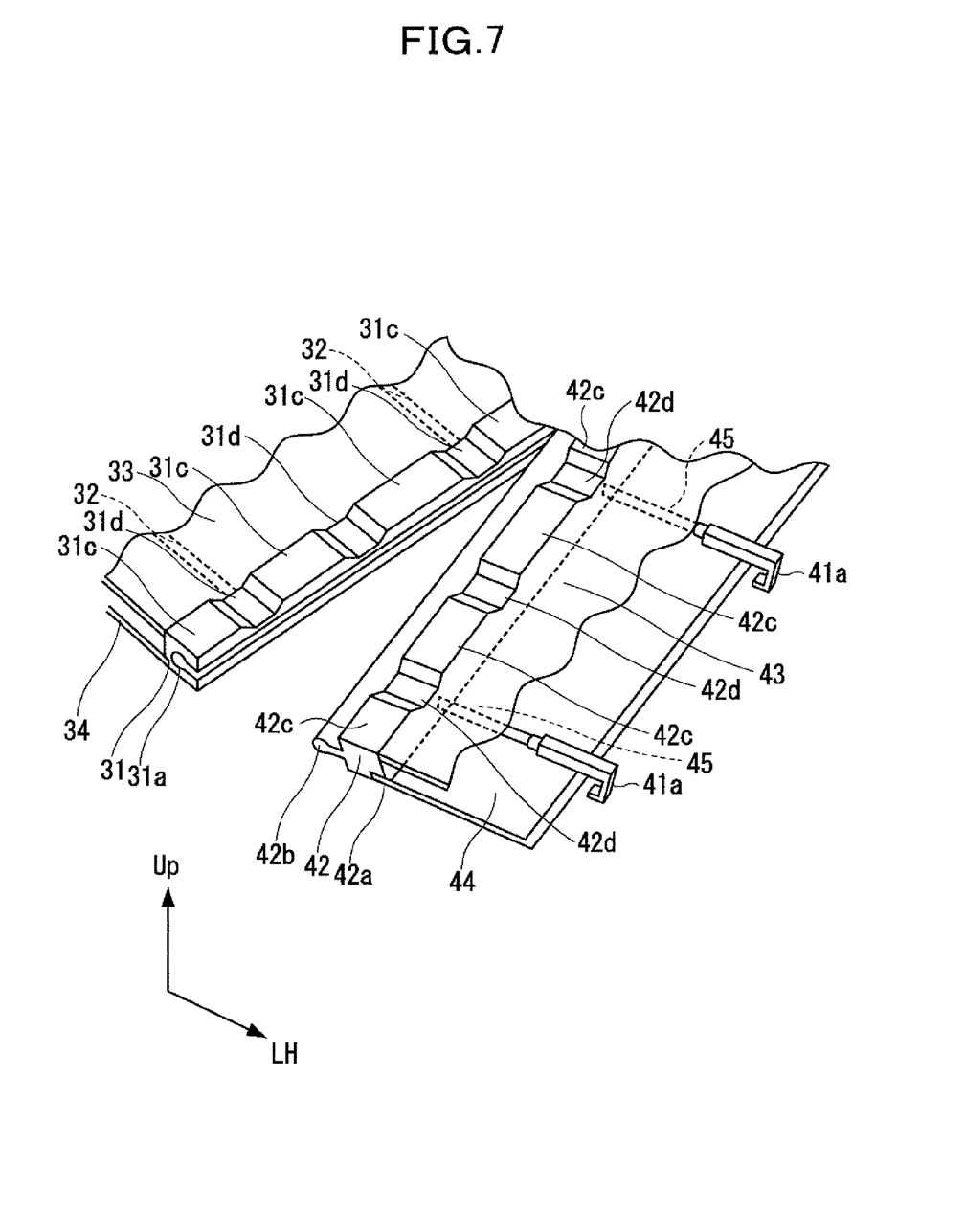
FIG. 7 is a perspective view depicting the engagement of the inner cover member and the outer cover member of a sliding roof structure.
Figure 8:
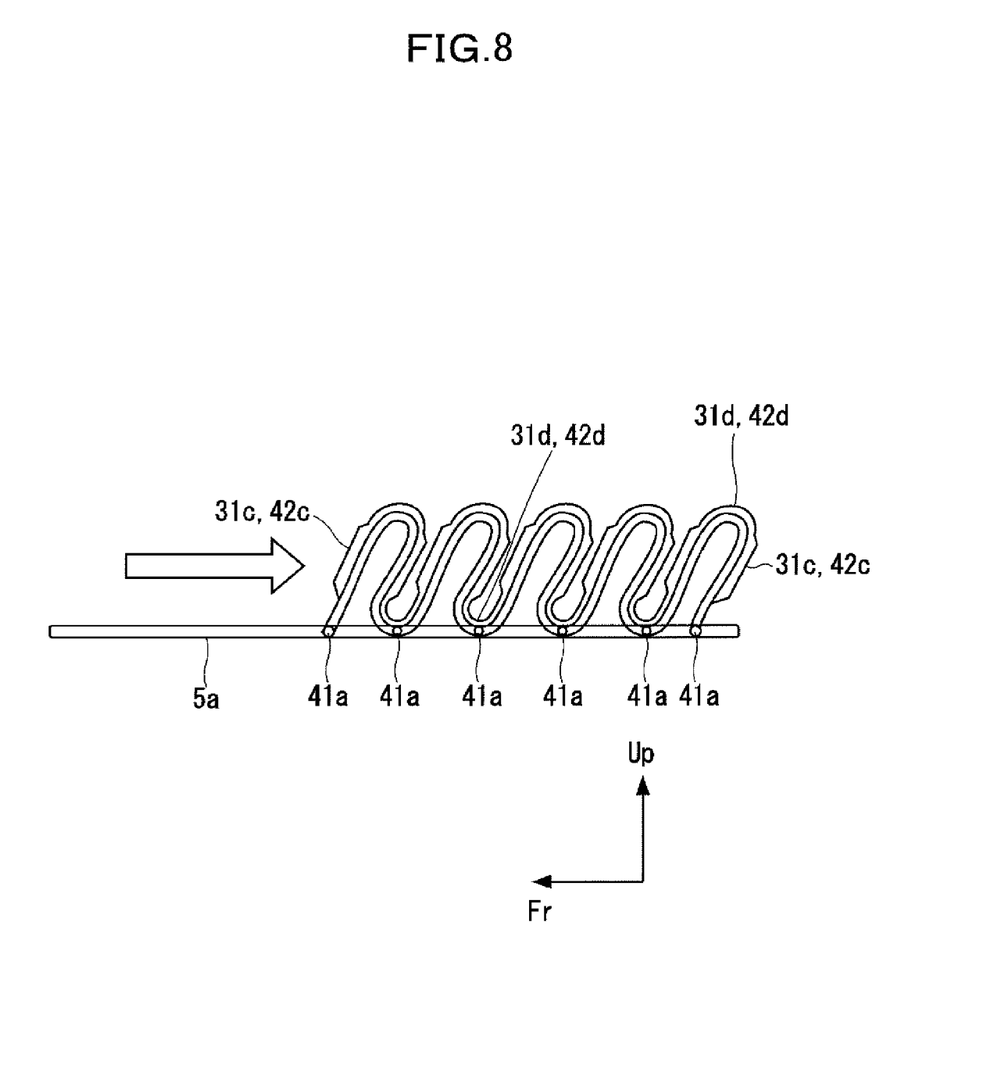
FIG. 8 is a side view depicting a state in which the sliding member of the cover is slid along the rail from the front to the rear side of the vehicle.

FIG. 7 is a perspective view depicting the engagement of the inner cover member 30 and the outer cover member 40. As shown in FIGS. 5 and 7, the portions of the frame on both right and left sides of the vehicle, which are comprised of the inner frame member 31 and outer frame member 42, extend undulated in the longitudinal direction of the vehicle, with the thick portion 31c, 42c and the thin portion 31d, 42d placed alternately. In the right and left frame portions of the inner cover member 30, which has the thick portion 31c and the thin portion 31d placed one after another, structural members 32 are mounted in the width direction of the vehicle at every other thin portion 31d. The structural members 32 support the cover sheets 33, 34 in the width direction, and maintain the tension of the sheets. Meanwhile, in the right and left frame portions of the outer cover member 40, which has the thick portion 42c and the thin portion 42d placed one after another, sliding members 41a, are mounted in the width direction of the vehicle via a skeletal member 45 at every other thin portion 42d. The skeletal member 45 may be a rod stock made of steel, for example.

As described above, in the right and left frame portions comprised of the inner frame member 31 and the outer frame member 42, a structural member 32, sliding member 41a, and skeletal member 45 are mounted to the thin portion 31d, 42d. Consequently, when the sliding members 41a, 41b are to be slid from the front to the rear side along the rail 5a, the thin portion 31d, 42d equipped with a structural member 32 or skeletal member 45 is valley-folded, whereas the thin portion 31d, 42d not equipped with a structural member 32 or skeletal member 45 is mountain-folded, which facilitates folding the cover member 2 in corrugated state. On the contrary, the cover member 2 can be stretched by sliding it toward the front side of the vehicle. The roof can thus be opened or closed easily with minimum energy.

Figure 9:
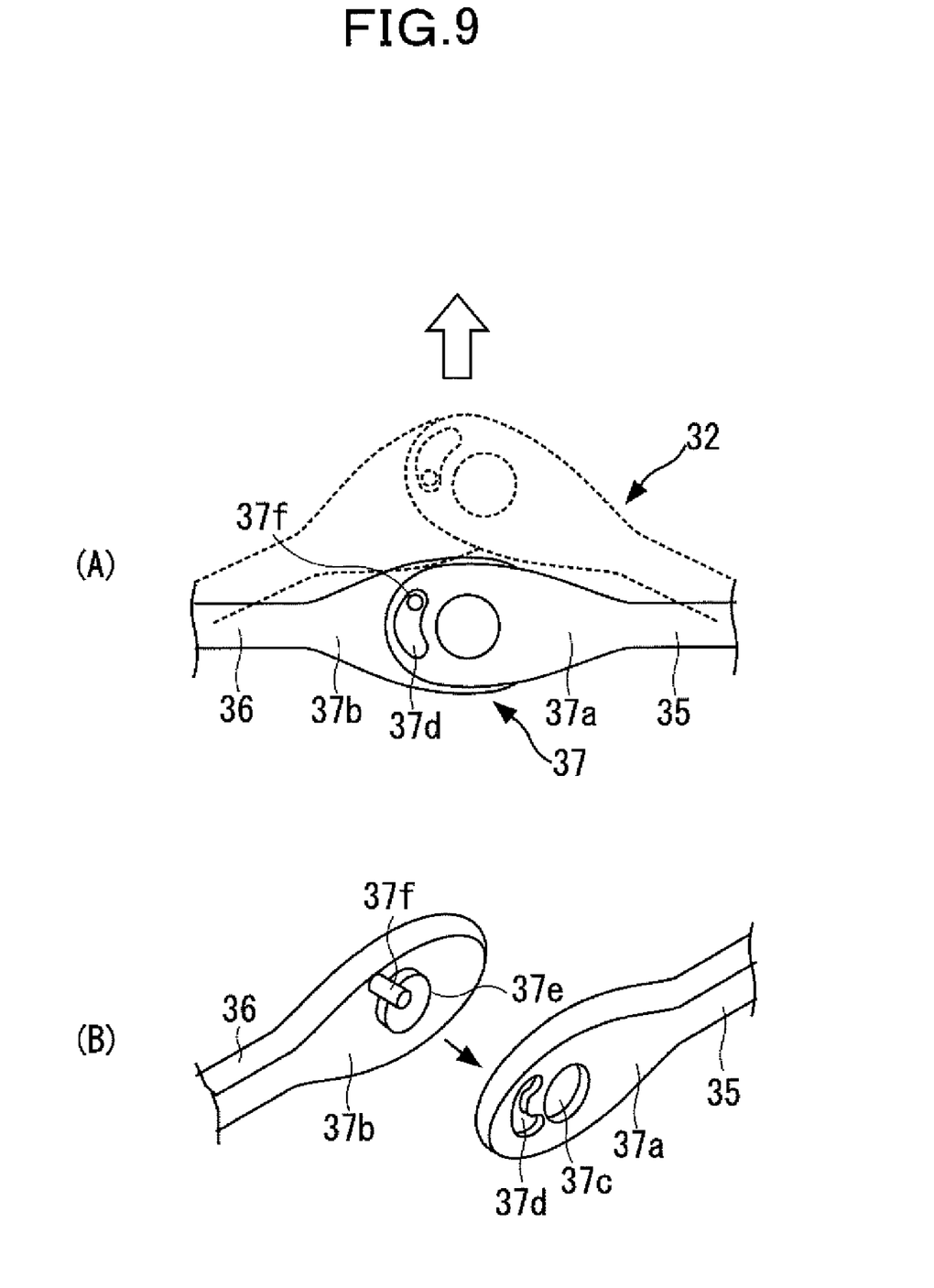
FIG. 9 illustrates the joint portion of the structural member, with (A) depicting connected state while (B) depicting disconnected state.

A preferable embodiment of the structural member is described below. The structural member 32 should not be a simple rod stock, but it is desirable that it be configured by connecting a pair of rod-shaped members 35, 36 with a joint portion 37. FIG. 9 shows the parts of the joint portion 37a, 37b, with (A) depicting connected state and (B) disconnected state. As shown in FIG. 9, a shaft hole 37c is made on one part of the joint portion 37a. A crescent hole 37d is made next to the shaft hole 37c, on the side nearer to the other rod-shaped member 36, and not on the side nearer to the root of the part of the joint portion 37a. A shaft 37e protruding toward the part of the joint portion 37a of the rod-shaped member 35 is formed on the part of the joint portion 37b of the rod-shaped member 36, and a protrusion 37f is formed next to the shaft 37e, slightly to the top, on the side nearer to the root of the part of the joint portion 37b, namely, nearer to the inner frame member 31. The protrusion 37f is inserted into the crescent hole 37d, and the shaft 37e is inserted into the shaft hole 37c in rotatable state. As shown by the dotted line in the figure, the movement of the protrusion 37f is restricted by the crescent hole 37d, the both edge portions of the structural member 32, as opposed to the center portion, move only in the range allowed by the vertical movement of the protrusion 37d within the crescent hole 37d. Specifically, the structural member 32 includes a pair of rod-shaped members 35, 36 connected with a joint portion 37, wherein the edge portion of the structural member 32 opposite to the joint portion 37 does not rotate upward.

As shown in the white arrow in FIG. 6, a user can push the inner cover member 30 upward from within the vehicle to remove the inner cover member 30 from the outer cover member 40. Pushed upward from inside the vehicle, the joint portion 37 of the structural member 32 goes up, shaping the structural member 32 into inverted V, and thus disengaging the inner frame member 31 from the outer frame member 42.

Figure 10:
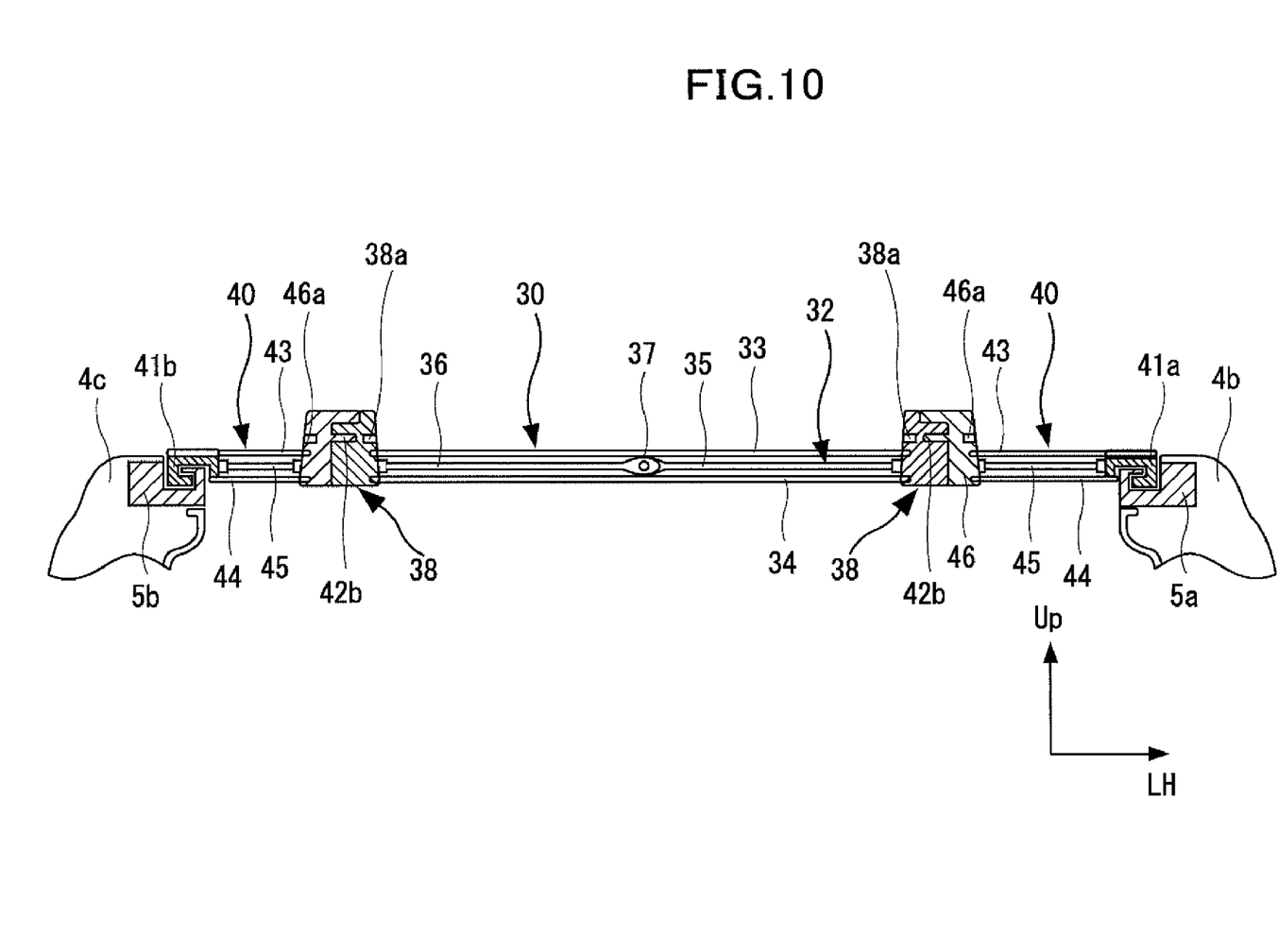
FIG. 10 is a cross-sectional view of an alteration in the second embodiment of the present invention, equivalent to FIG. 6.

The second embodiment is detailed below. FIG. 10 is a cross-sectional view of a modification example equivalent to FIG. 6. The identical or corresponding members are marked with the same signs, and description is omitted. In the modification example shown in FIG. 10, the concave 38a of the inner frame member 38 and the concave 46a of the outer frame member 46 are formed encircling the open section at a place higher than the mounting position of the top cover sheet 33. The bottom plate 50d, 50e of the fixture 50 provided with a slit, which is to be described later, are inserted into these concaves to connect the pair.

Figure 11:
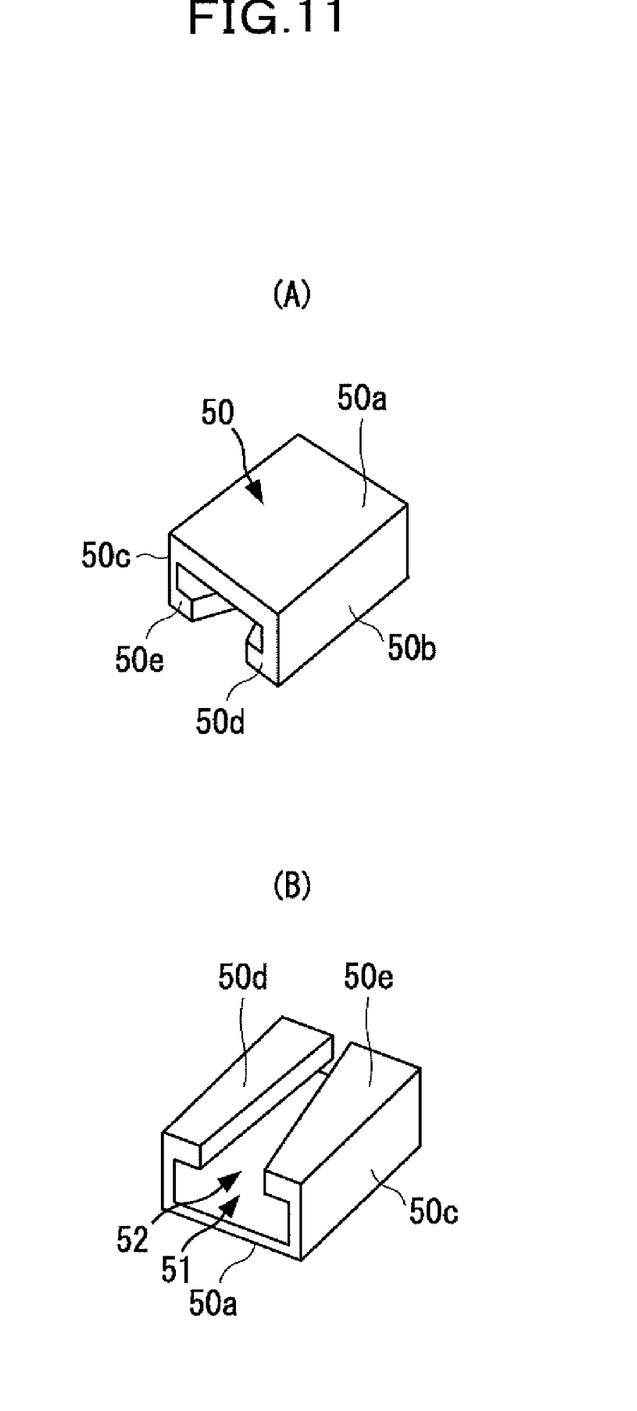

FIG. 11 (A) is a perspective view of the fixture in FIG. 10 viewed from behind, whereas FIG. 11 (B) depicts the fixture placed upside down and viewed from behind. The fixture 50 has a top plate 50a, side plates 50b, 50c, which extend downward vertically from the both sides of the top plate 50a, and bottom plates 50d, 50e, which are parallel to the top plate 50a, with a slit 52 provided in between, all of these forming an open section 51 for tucking in the inner frame member 38 and the outer frame member 46. The slit 52 is tapered in the longitudinal direction of the fixture 50. The fixture 50 is operated in the direction from the narrower side toward the wider side of the slit to attach the inner frame member 38 to the outer frame member 46.

Figure 12:
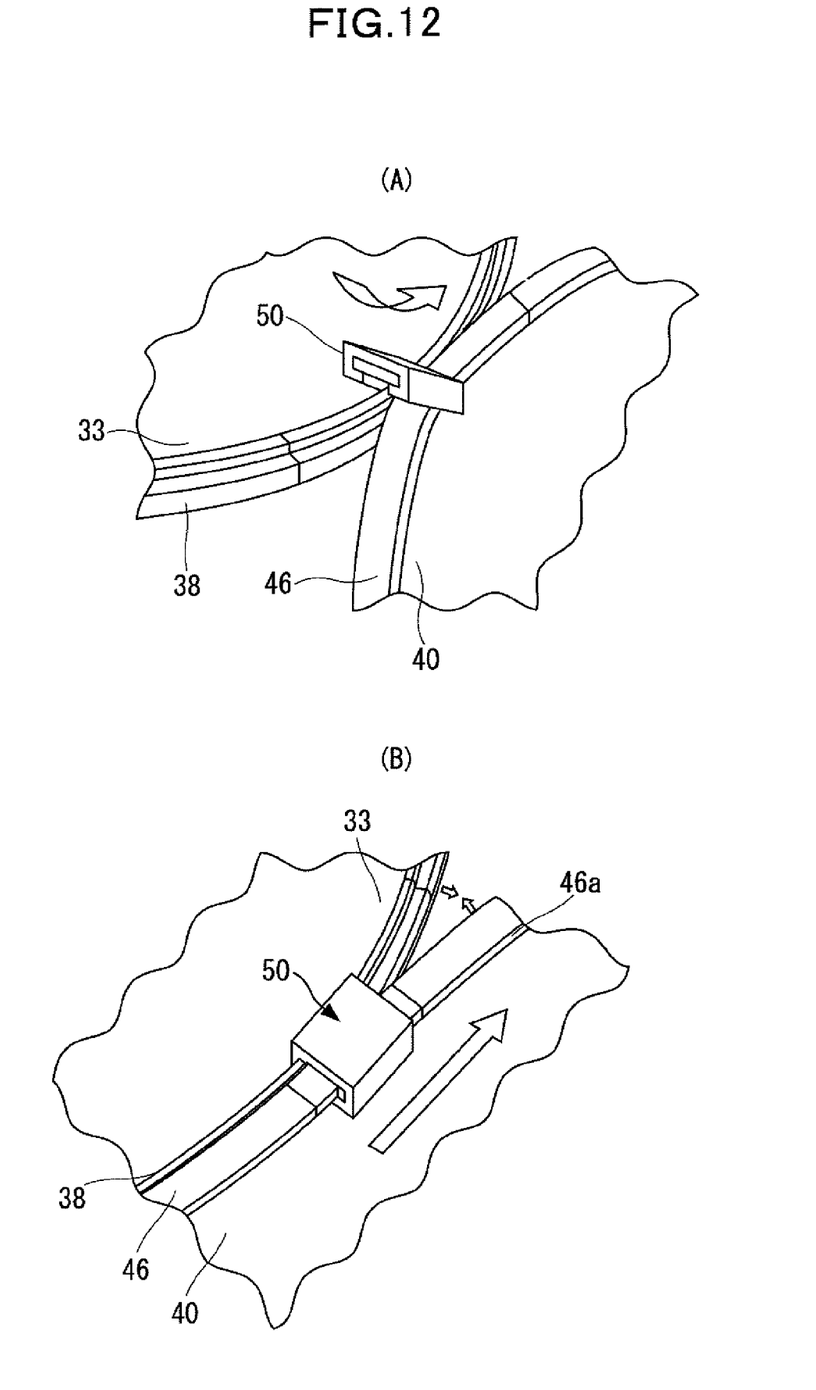
FIG. 12 illustrates the process of integrating the inner side of the cover with the inner periphery of the outer cover member using a fixture.

FIG. 12 shows the process of integrating the inner cover member 30 with the inner periphery of the outer cover member 40 using the fixture 50. The engaging portion 42b of the outer frame member 46 is inserted into a part of the groove 38a of the inner frame member 38, and as shown in FIG. 12(A), the bottom plates 50d, 50e are inserted into the concave 38a of the inner frame member 38 and that of the outer frame member 46. As shown in FIG. 12(B), the fixture 50 is slid along the inner frame member 38 and the outer frame member 46 to integrate the inner cover member 30 into the inner periphery of the outer cover member 40. By sliding the fixture 50 provided with the open section 51 along the inner frame member 38 and the outer frame member 46 while connecting them, the inner cover member 30 is attached to the outer cover member 40.

As described above, in the sliding roof structure related to the second embodiment of this invention, the engaging portion 42b of the outer cover member 40 is engaged in the groove 31a of the inner cover member 30. Consequently, the user of the sliding roof type vehicle 1 can remove the inner cover member 30 by pushing it up from inside the vehicle, thus breaking the engagement between them. Users can provide multiple replacement inner cover members 30 having a top cover sheet 33 of their choice of colors and patterns in advance, and select a desired inner cover member 30 as desired depending on the mood of the day or destinations. If the top cover sheet 33 is damaged, the inner cover member 30 can be replaced easily.

In the embodiments of this invention, the first cover member is attached to the second cover member in detachable state. Specifically, the inner cover member is attached to the outer cover member in detachable state, or the top cover member is attached to the base cover member in detachable state. Consequently, users can replace the first cover member as required depending on driving conditions and occasions. Since damaged or degraded cover sheet can also be replaced easily, maintenance is facilitated. Furthermore, vehicles with advertisement printed on the top cover sheet of the inner cover member can be used for advertisement and sales operations.

What is claimed is:

1. A sliding roof structure of a vehicle comprising:
rails installed along the right and left sides of the roof of the vehicle, and
a cover member which is slid and folded along the rails,
wherein the cover is made up of a detachable inner cover member and an outer cover member, which slides along the rails and to which the inner cover member is attached in detachable state,
the inner cover member includes a quasi-rectangular inner frame member, multiple structural members which bridge the inner frame member in the width direction of the vehicle, and a pair of cover sheets at the top and bottom stretched over the inner frame member,
the outer cover member includes a quasi-rectangular outer frame member enclosing the inner frame member, multiple sliding members installed in the width direction of the vehicle, and a pair of cover sheets at the top and bottom stretched over the outer frame member, either one of the inner frame member or the outer frame member includes an engaging portion on the side facing the other, the engaging portion being inserted into a groove, and the inner cover member thus being attached to the outer cover member in detachable state.

2. The sliding roof structure according to claim 1, wherein a pair of rod-shaped members is connected via a joint portion, and the outer edges of the rod-shaped members do not rotate upward.

3. The sliding roof structure according to claim 1, wherein the right and left side portions of the inner frame member and the outer frame member, which are placed along the sides of the roof, are undulated along the longitudinal direction of the vehicle, with thin portion and thick portion placed alternately, to facilitate folding the cover member.

4. The sliding roof structure according to claim 1, wherein the inner cover member is attached to the outer cover member by sliding a fixture provided with an opening section along the inner frame member and the outer frame member while integrating the inner frame member and the outer frame member.

5. A sliding roof structure of a vehicle comprising:
rails installed on the right and left side portions of the roof of the vehicle; and
a cover member which is slid and folded along the rails;
wherein the cover member is made up of a base cover member which has a bottom frame member and a bottom cover sheet stretched over the bottom frame member, and a top cover member which has a top frame member and a top cover sheet stretched over the top frame member,
either one of the top frame member or the bottom frame member being provided with an engaging portion, whereas the other being provided with a support portion for engaging, and the engaging portion being inserted into the support portion for engaging so as to attach the cover base member to the top cover member in detachable state.

6. The sliding roof structure according to claim 5, wherein the support portion is a groove which is cut along the bottom frame member;
the engaging portion is formed on the top frame member so that the engaging portion (14a) has convex cross-sectional area; and
the engaging portion is inserted into the groove.

7. The sliding roof structure according to claim 6, wherein the right and left side portions of the bottom frame member, which extend in the longitudinal direction of the vehicle, are undulated, with a thin portion and a thick portion placed one after another in the longitudinal direction of the vehicle, to facilitate folding the cover member.

8. The sliding roof structure according to claim 7, wherein sliding members are placed on the sides of the roof at every other thin portion, which is alternately placed with thick portion; and
structural members are bridged between the left and the right side portions of the frame at every other thin portion, which is alternately placed with a thick portion.

9. A vehicle having the sliding roof structure of any one of claims 1-8.

* * * * *